United States Patent [19]

Tadros

[11] Patent Number: 5,669,586
[45] Date of Patent: Sep. 23, 1997

[54] SATELLITE GRAVITY GRADIENT COMPENSATION USING ON-ORBIT SOLAR ARRAY REORIENTATION

[75] Inventor: Alfred H. Tadros, Palo Alto, Calif.

[73] Assignee: Space Systems/Loral, Inc., Palo Alto, Calif.

[21] Appl. No.: 349,950

[22] Filed: Dec. 6, 1994

[51] Int. Cl.⁶ ................................................. B64G 1/34
[52] U.S. Cl. ........................ 244/167; 244/173; 244/168
[58] Field of Search ........................... 244/158 R, 164, 244/167, 168, 173

[56] References Cited

U.S. PATENT DOCUMENTS

| | | | |
|---|---|---|---|
| 3,168,263 | 2/1965 | Kamm | 244/1 |
| 3,268,183 | 8/1966 | Etkin | 244/1 |
| 3,270,984 | 9/1966 | Rice | 244/1 |
| 3,386,686 | 6/1968 | Phillips | 244/1 |
| 3,427,623 | 2/1969 | Yater | 343/705 |
| 3,429,525 | 2/1969 | Rushing | 244/1 |
| 3,516,622 | 6/1970 | Paige et al. | 244/1 |
| 3,519,222 | 7/1970 | Altekruse et al. | 244/1 |
| 3,560,642 | 2/1971 | Schroader et al. | 178/6.8 |
| 3,567,155 | 3/1971 | Gatlin et al. | 244/1 |
| 3,582,016 | 6/1971 | Sherman | 244/1 |
| 3,582,019 | 6/1971 | Pisacane | 244/1 |
| 3,582,020 | 6/1971 | Wrench | 244/1 SA |
| 3,601,338 | 8/1971 | Shigehara | 244/1 SA |
| 3,635,425 | 1/1972 | Swet | 244/1 SS |
| 3,640,487 | 2/1972 | Wanger | 244/1 SA |
| 3,698,661 | 10/1972 | Wyatt | 244/1 AS |
| 3,768,756 | 10/1973 | Buckingham | 244/1 SA |
| 4,097,010 | 6/1978 | Colombo et al. | 244/158 |
| 4,684,084 | 8/1987 | Fuldner et al. | 244/168 |
| 4,728,061 | 3/1988 | Johnson et al. | 244/164 |
| 4,757,964 | 7/1988 | McIntyre | 244/164 |
| 4,807,835 | 2/1989 | Fowler | 244/166 |
| 4,834,325 | 5/1989 | Faget et al. | 244/173 |
| 5,310,144 | 5/1994 | Salvatore et al. | 244/168 |
| 5,312,073 | 5/1994 | Flament et al. | 244/168 |

FOREIGN PATENT DOCUMENTS

| | | |
|---|---|---|
| 0 195 553 | 9/1986 | European Pat. Off. . |
| 0 578 176 | 1/1994 | European Pat. Off. . |
| WO 92/09479 | 6/1992 | WIPO . |

*Primary Examiner*—Galen L. Barefoot
*Attorney, Agent, or Firm*—Perman & Green, LLP

[57] ABSTRACT

A method for operating an orbiting spacecraft includes the steps of (a) changing a mass distribution of the spacecraft from a first mass distribution for setting a first principal moment of inertia of the spacecraft along a first axis approximately equal to a second principal moment of inertia of the spacecraft along a second axis, thereby minimizing a gravity gradient torque about a third axis; (b) performing a desired activity while the gravity gradient torque about the third axis is minimized; and (c) resetting the mass distribution back to the first mass distribution at a completion of the desired activity. The spacecraft includes a plurality of solar array panels, and the step of changing is accomplished by varying a position of at least two of the solar array panels away from a sun-pointing configuration. Also disclosed is a method for stabilizing the spacecraft to resist a rotation about an axis by varying the positions of solar array panels.

10 Claims, 1 Drawing Sheet

SATELLITE GRAVITY GRADIENT COMPENSATION USING ON-ORBIT SOLAR ARRAY REORIENTATION

FIELD OF THE INVENTION

This invention relates generally to satellite stabilization and positioning systems.

BACKGROUND OF THE INVENTION

All spacecraft in Earth orbit are exposed to a gravitational field that weakens with distance from the Earth. This results in the formation of a gravity gradient across the spacecraft which manifests itself as a torque on the spacecraft. This torque is generally undesirable and must be compensated for by using on-board actuators (e.g., reaction wheels or thrusters). However, the use of these actuators will typically induce a vibration within the spacecraft.

For those spacecraft carrying payloads that are sensitive to vibrations, such as imaging payloads, it is beneficial to minimize vibrations to the spacecraft body while still rejecting external disturbance torques. It can thus be appreciated that the avoidance of the use of vibration sources such as reaction wheels, thrusters and other actuators during vibration-sensitive imaging is a desirable goal. However, avoiding the use of these vibration sources is feasible only if the disturbance torques on the spacecraft are minimized before they have the opportunity to act upon the spacecraft.

SUMMARY OF THE INVENTION

The foregoing and other problems are overcome by a method for minimizing the effects of gravity gradient torques upon a spacecraft, thereby reducing or eliminating a requirement to employ actuators during vibration-sensitive periods of spacecraft operation.

To achieve a minimization of gravity gradient torques on a spacecraft in Earth orbit this invention teaches a method for reorienting the spacecraft's solar array panels in order to modify the principal axes moments of inertia of the spacecraft. Also referred to herein as "inertia shaping", the method is performed, preferably, just before the start of a vibration-sensitive period of spacecraft operation. For example, the method may be performed just prior to obtaining an image with an on-board imaging system. After imaging is complete the solar array panels are oriented back to a nominal sun-pointing configuration. Flat panel solar arrays are provided with two axes of rotation to be effective for inertia shaping. The teaching of this invention is especially beneficial when the inertia of the solar array panels dominates that of the spacecraft; which is often the case with relatively small, high power low earth orbit (LEO) satellites.

In accordance with this invention there is provided a method for operating an orbiting spacecraft. The method includes the steps of (a) changing a mass distribution of the spacecraft from a first mass distribution for setting a first principal moment of inertia of the spacecraft along a first axis approximately equal to a second principal moment of inertia of the spacecraft along a second axis, thereby minimizing a gravity gradient torque about a third axis; (b) performing a desired activity while the gravity gradient torque about the third axis is minimized; and (c) resetting the mass distribution back to the first mass distribution at a completion of the desired activity. The spacecraft includes a plurality of solar array panels, and the step of changing is accomplished by varying a position of at least two of the solar array panels away from a sun-pointing configuration.

Also disclosed is a method for stabilizing an orbiting spacecraft. This method includes the steps of (a) altering a mass distribution of the spacecraft from a first mass distribution for setting a first principal moment of inertia of the spacecraft along a first axis to be greater than a second principal moment of inertia of the spacecraft along a second axis, thereby reversing a sign of a gravity gradient torque upon the spacecraft and resisting a rotation of the spacecraft about a third axis; (b) performing a desired activity while the sign of the gravity gradient torque is reversed; and (c) resetting the mass distribution back to the first mass distribution at a completion of the desired activity. The spacecraft includes a plurality of solar array panels, and the step of altering is accomplished by varying a position of at least two of the solar array panels away from a sun-pointing configuration.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1A:
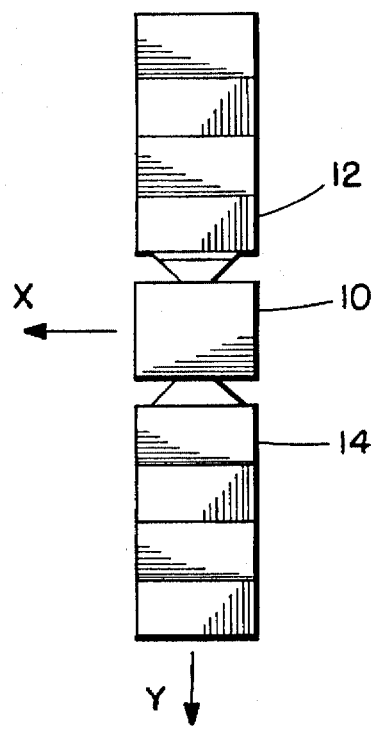
FIG. 1a is a front view and FIG. 1b a side view illustrating a three axis stabilized spacecraft with solar array panels extending in a north and south direction along a Y axis.
Figure 1B:
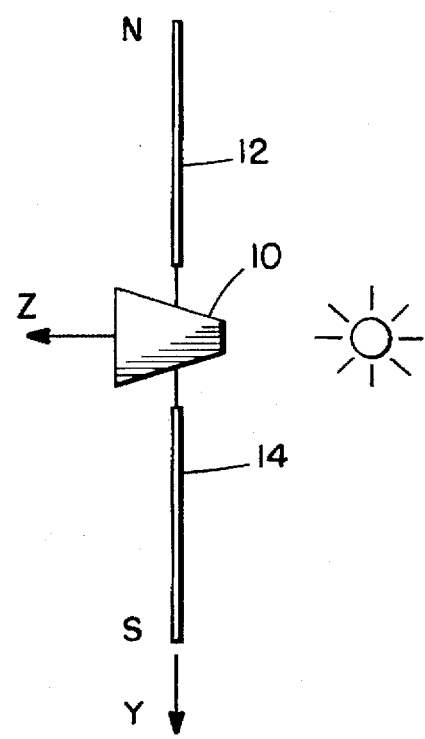

FIGS. 1a and 1b illustrate a typical 3-axis stabilized spacecraft 10 with solar panels 12 and 14 extending along a Y axis (north and south direction). In FIGS. 1a and 1b the X axis is the roll axis, the Y axis is the pitch axis, and the Z axis is the yaw axis. The Z axis nominally points to the center of the Earth. The solar array panels 12 and 14 are preferably positioned so that a line drawn through the sun is normal to the plane of the solar array panels.

Figure 2:
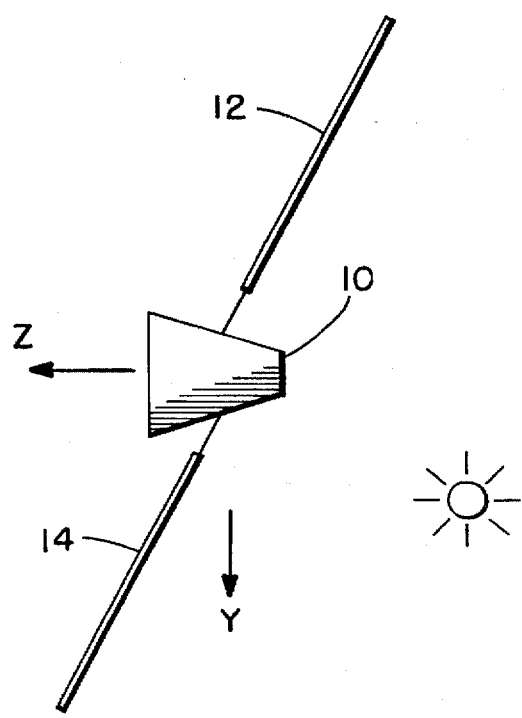
FIG. 2 illustrates a spacecraft with solar array panels tilted to point to the sun when in an inclined orbit.

In order to point towards the sun while in an inclined orbit, as is typically the case for a LEO satellite, the solar array panels 12 and 14 are tilted away from the principal moment of inertia axes (and orbital coordinate frame) as shown in FIG. 2. However, this tilting of the solar array panels 12 and 14 results in the generation of a gravity gradient torque upon the spacecraft 10, as is described below in Equations 1, 2 and 3. In the Equations Ixx, Iyy and Izz are the principal moments of inertia of the spacecraft 10 along the X, Y and Z axes, respectively, of the orbital coordinate frame.

$$\tau_x = \frac{3\theta}{R^3} (I_{zz} - I_{yy})\sin(\Phi)\cos(\Phi)\cos^2(\theta) \quad (1)$$

$$\tau_y = \frac{3\theta}{R^3} (I_{zz} - I_{xx})\sin(\theta)\cos(\theta)\cos(\Phi) \quad (2)$$

$$\tau_z = \frac{3\theta}{R^3} (I_{yy} - I_{xx})\sin(\theta)\cos(\theta)\sin(\Phi) \quad (3)$$

where $\phi$=roll, $\theta$=pitch, R=orbit radius and where $\hat{v}$=the gravitational constant.

The inventor has determined that if the solar array panels 12 and 14 are oriented such that Iyy is made equal to Izz, the gravity gradient torque about the X axis (roll) becomes zero, regardless of the spacecraft body orientation in roll, pitch, or yaw. Similarly, if the solar array panels 12 and 14 are oriented such that Ixx is equal to Izz, there is no Y axis (pitch) gravity gradient torque. Finally, if the solar array panels 12 and 14 are oriented such that Ixx is equal to Iyy there is no Z axis (yaw) gravity gradient torque.

The inventor has exploited these relationships in a novel manner so that by setting two of the spacecraft's principal moments of inertia equal to one another, the gravity gradient torque about the third axis is minimized. The presently preferred technique for varying the principal moments of inertia is to employ the solar array panels 12 and 14.

Figure 3:
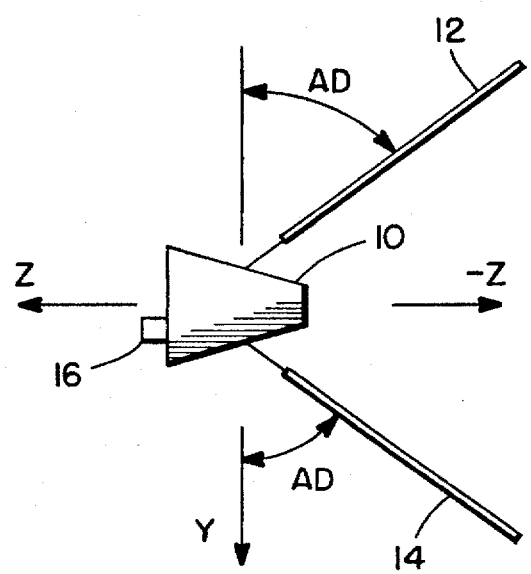
FIG. 3 illustrates a temporary reorientation of the spacecraft solar array panels, in accordance with this invention, to minimize a difference between two principal axes moments of inertia, thereby minimizing a gravity gradient about a third axis.

FIG. 3 shows one inertia shaping configuration whereby the solar array panels are tilted towards the minus Z axis, thereby minimizing the difference between Izz and Iyy. In this configuration, and in accordance with this invention, the X axis (roll) gravity gradient torque is minimized. During the time that the undesirable torque is minimized some desired vibration-sensitive activity can be accomplished, such as taking an image with an imaging system 16. After taking the image the solar array panels are reoriented back towards the normal sun-pointing configuration.

It should be noted that if the solar array panels are tilted past the point where two of the spacecraft's principal moments of inertia are made equal to one another such that, by example, Iyy becomes greater than Izz, the sign of the gravity gradient torque is reversed and thus acts on the spacecraft in a stabilizing manner, thereby resisting a rotation of the spacecraft about the X axis. During this time a desired activity can be performed, such as taking an image or performing a communication function, after which the solar array panels are reoriented back to their normal sun-pointing configuration. Similarly, if Ixx is made greater than Izz, the gravity gradient torque resists rotations about the y axis.

The required angular deviation of the solar array panels 12 and 14 from a reference axis (indicated as AD in FIG. 3) can be determined prior to launch from the mass and inertia distribution properties of the spacecraft. These mass parameters can be further refined after the spacecraft is placed in orbit by the use of conventional techniques. The predetermined angular deviation is not orbit dependent, but is instead a function of the spacecraft mass.

As an example, and referring to the case of FIG. 3 where it is desired to minimize the gravity gradient torque about the roll (x) axis; for a LEO spacecraft having a nominal moment of inertia of A and which includes two solar array panels each with a moment of inertia of B, the value of AD is approximately 46 degrees. With AD equal to 46 degrees the spacecraft inertia becomes C, where, by example, $$A = \begin{bmatrix} 636 & 0 & 0 \\ 0 & 275 & 0 \\ 0 & 0 & 845 \end{bmatrix}; \quad B = \begin{bmatrix} 287 & 0 & 0 \\ 0 & 32 & 0 \\ 0 & 0 & 307 \end{bmatrix};$$

$$C = \begin{bmatrix} 636 & 0 & 0 \\ 0 & 560 & -274 \\ 0 & -274 & 560 \end{bmatrix}.$$

Commands to orient and re-orient the solar array panels 12 and 14 can be sent to the spacecraft 10 from a ground station prior to and after performing a desired vibration-sensitive operation. Alternatively, the spacecraft 10 can be programmed to automatically orient and re-orient the solar array panels 12 and 14 prior to and after performing the desired vibration-sensitive operation.

A consideration in employing the teaching of this invention is the spacecraft power. That is, if the spacecraft 10 cannot tolerate a short duration loss of solar power, then orienting the solar panel arrays 12 and 14 to point away from the sun may not be acceptable. However, for periodic imaging purposes the spacecraft 10 can use, and often times requires the use of, power from on-board batteries during imaging. In this case temporarily pointing the solar array panels 12 and 14 away from the sun is not detrimental. The solar array panels 12 and 14 are returned then to their nominal sun-pointing configuration to recharge the batteries in preparation for taking the next image.

While the invention has been particularly shown and described with respect to a preferred embodiment thereof, it will be understood by those skilled in the art that changes in form and details may be made therein without departing from the scope and spirit of the invention.

What is claimed is:

1. A method for operating an orbiting spacecraft, comprising the steps of:

changing a mass distribution of the spacecraft from a first mass distribution for setting a first principal moment of inertia of the spacecraft along a first axis approximately equal to a second principal moment of inertia of the spacecraft along a second axis, thereby minimizing a gravity gradient torque about a third axis;

performing a desired activity while the gravity gradient torque about the third axis is minimized; and resetting the mass distribution back to the first mass distribution at a completion of the desired activity; wherein the spacecraft includes a plurality of solar array panels, wherein the step of changing is accomplished by varying a position of at least two of the solar array panels away from a sun-pointing configuration, and wherein the step of resetting is accomplished by varying a position of the at least two solar array panels back to the sun-pointing configuration.

2. A method as set forth in claim 1, wherein the orbiting spacecraft is located in low earth orbit.

3. A method for operating a three axis stabilized orbiting spacecraft of a type that includes a plurality of solar array panels, the orbiting spacecraft having principal moments of inertia Ixx, Iyy and Izz along X, Y and Z axes, respectively, of an orbital coordinate frame, comprising the steps of:

changing a mass distribution of the spacecraft from a first mass distribution by varying an angular position of at least two of the solar array panels away from a sun-pointing configuration for setting one of a pair of Ixx and Iyy, Iyy and Izz, and Ixx and Izz approximately equal to one another, thereby minimizing a gravity gradient torque about a third axis that is not an axis associated with the pair of principal moments of inertia that are approximately equalized;

performing a desired activity while the gravity gradient torque about the third axis is minimized; and resetting the mass distribution back to the first mass distribution at a completion of the desired activity by varying the angular position of the at least two solar array panels towards the sun-pointing configuration.

4. A method as set forth in claim 3 wherein the step of changing is initiated by a command generated external to the spacecraft.

5. A method as set forth in claim 3 wherein the step of changing is initiated by a command generated internal to the spacecraft.

6. A method as set forth in claim 3 wherein the step of changing includes a step of rotating the at least two solar array panels through at least two degrees of rotational freedom.

7. A method as set forth in claim 3 wherein the step of performing a desired activity includes a step of taking an image with an imaging device that is carried by the spacecraft.

8. A method as set forth in claim 3, wherein the orbiting spacecraft is located in low earth orbit.

9. A method for stabilizing an orbiting spacecraft, comprising the steps of:

altering a mass distribution of the spacecraft from a first mass distribution for setting a first principal moment of inertia of the spacecraft along a first axis to be greater than a second principal moment of inertia of the spacecraft along a second axis, thereby reversing a sign of a gravity gradient torque upon the spacecraft and resisting a rotation of the spacecraft about a third axis;

performing a desired activity while the sign of the gravity gradient torque is reversed; and resetting the mass distribution back to the first mass distribution at a completion of the desired activity;

wherein the spacecraft includes a plurality of solar array panels, wherein the step of altering is accomplished by varying a position of at least two of the solar array panels away from a sun-pointing configuration, and wherein the step of resetting is accomplished by varying the position of the at least two solar array panels back to the sun-pointing configuration.

10. A method as set forth in claim 9, wherein the orbiting spacecraft is located in low earth orbit.

* * * * *